United States Patent

Ravanini

[11] Patent Number: 5,844,733
[45] Date of Patent: Dec. 1, 1998

[54] REVERSIBLE EXTERNAL SIDEVIEW MIRROR

[75] Inventor: Oswaldo Luiz Ravanini, Diadema-Estado de São Paulo, Brazil

[73] Assignee: Metagal Industria & Comercio LTDA, Sao Paulo, Brazil

[21] Appl. No.: 899,840

[22] Filed: Jul. 24, 1997

[30] Foreign Application Priority Data

Jul. 30, 1996 [BR] Brazil .................................. 9604028-9

[51] Int. Cl.$^6$ ............................ G02B 7/182; G02B 5/08; A47G 1/24
[52] U.S. Cl. ........................... 359/872; 359/841; 248/479
[58] Field of Search ................................... 359/840, 841, 359/871, 872; 248/475.1, 476, 479

[56] References Cited

U.S. PATENT DOCUMENTS 4,394,066   7/1983   Sharp ....................................... 248/481
5,337,188   8/1994   Do Espirito Santo .................. 359/872
5,726,816   3/1998   Gordon .................................... 359/872

*Primary Examiner*—Ricky D. Shafer
*Assistant Examiner*—Mark A. Robinson
*Attorney, Agent, or Firm*—Michael J. Striker

[57] ABSTRACT

A reversible external sideview mirror has a mirror element and a left/right reversing mechanism for alternatingly mounting the mirror on a left side and on a right side of the vehicle and including two joints, with an arm having a plurality of mirror stabilization grooves provided for a right side use and for a left side use, and formed by two segments a spring located in an angular joint a stepped swivel pin having a smaller diameter portion extending through the spring and a larger diameter portion which is pressed against the spring and an a elastic pin extending through a radial perforation provided in an end of the swivel pin and also in one of the mirror stabilization grooves for a right side use or in respect to one of the mirror stabilization grooves for a left side use, depending on whether the mirror is installed for use on the left side or the right side of the vehicle.

7 Claims, 2 Drawing Sheets

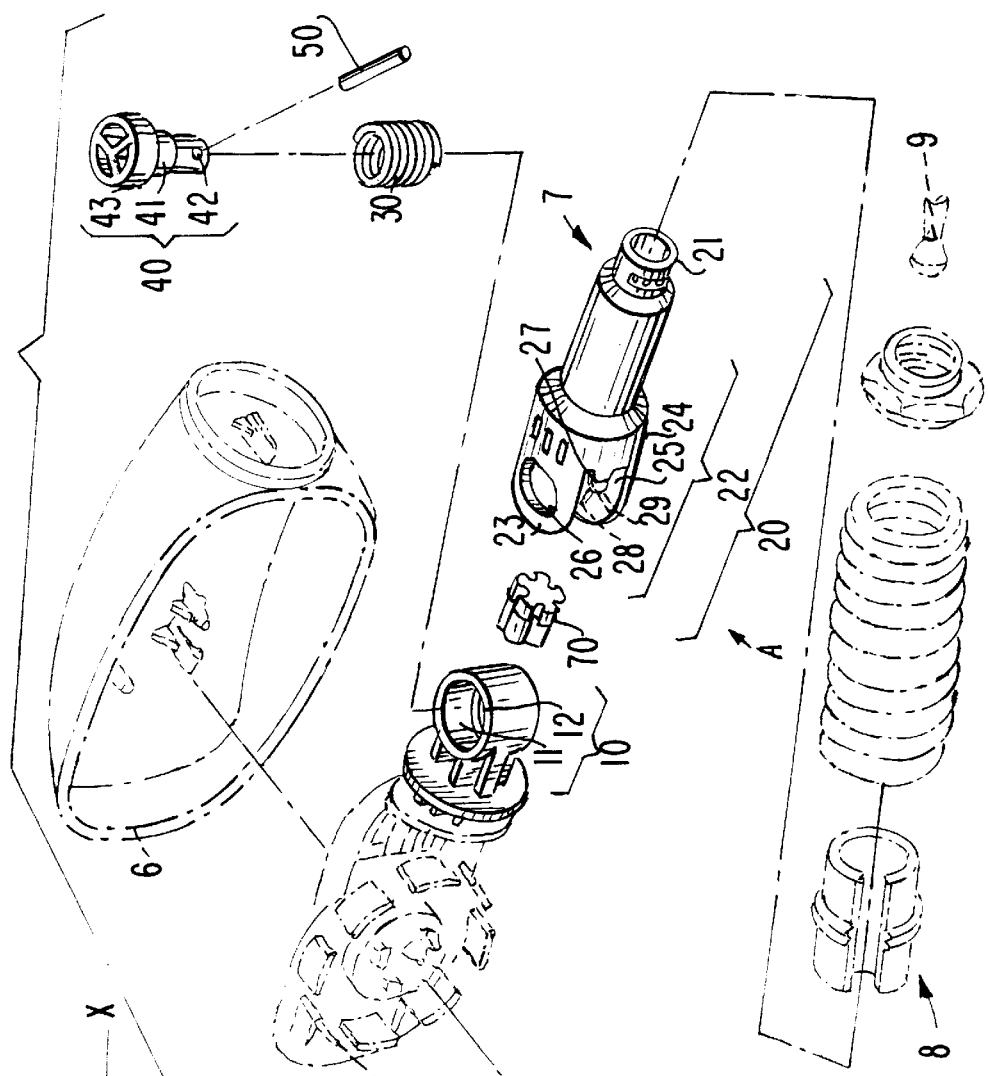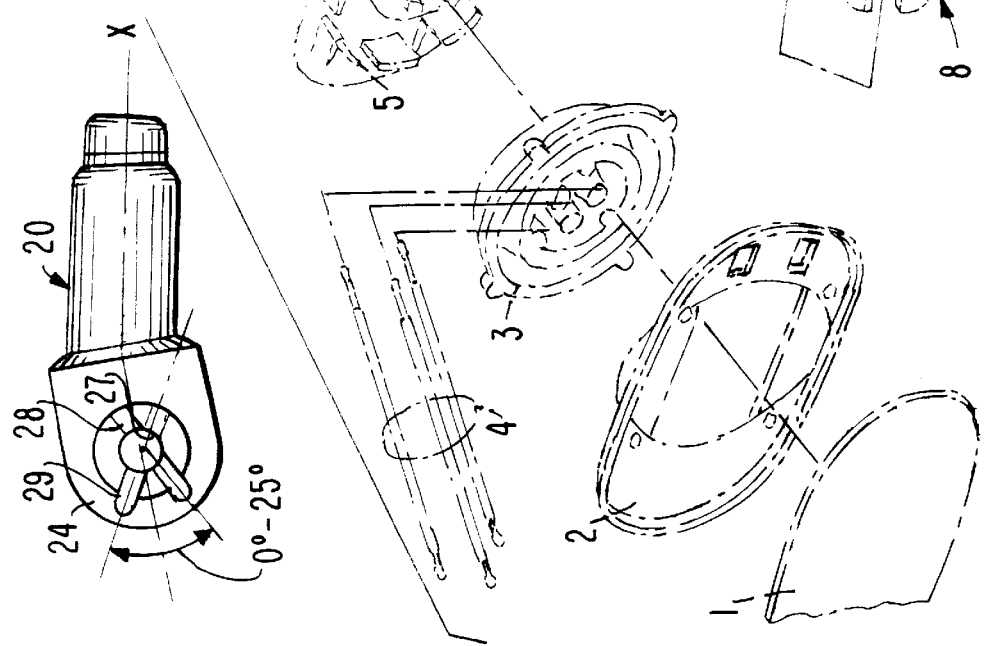

REVERSIBLE EXTERNAL SIDEVIEW MIRROR

BACKGROUND OF THE INVENTION

The present invention relates to a reversible sideview mirror.

More particularly, it relates to a reversible sideview mirror which can be installed either on the left or right side of a vehicle.

The left and the right sideview mirrors must be set at a different angles relative to the car body in view of the automobile drivers seating position. With conventional sideview mirrors, in order to produce this angular difference it is necessary to make specially designed different molds for the right side mirror and for the left side mirror. This causes some technical difficulties for the manufacturing process, since at least two different sets of mold are needed, which make difficult manufacture, maintenance and handling of the same. Also, substantial costs are necessary for providing several sets of molds.

In order to solve these problems, the so-called reversible side view mirrors were introduced in the market. They are designed uniformly, to be used either on the left side or on the right side of the car by some type of adjustments. However, the design of these mirrors is still complicated, which makes there production process cumbersome, both during the manufacture and assembly. The intricacy of the major design causes defects due to large number of parts that are susceptible to wear during the cost of its use. Moreover, for reversion between the one position and the other position, difficult and complicated procedures are necessary, which is of course a disadvantage.

SUMMARY OF THE INVENTION

Accordingly, it is an object of the present invention to provide a reversible external side view mirror, which avoids the disadvantages of the prior art.

In keeping with these objects and with others which will become apparent hereinafter, one feature of the present invention resides, briefly stated in a reversible external sideview mirror, which comprises the following elements: a mirror element provided with a mirror frame; a bearing assembly for said mirror frame; a support chassis 5 for supporting said bearing assembly; an operating transmission provided with an operating cable; and a left/right reversing mechanism for alternatingly mounting the mirror on a left side and on a right side of the vehicle, said reversing mechanism comprising a first angular joint incorporated in a side of said chassis turned toward a vehicle body and having a vertical stepped passage provided with a larger diameter section and a smaller diameter section, a second joint cooperating with said first angular joint and incorporated in a horizontal tubular support arm which has a base and an opposite end for mounting in a vehicle body, said second joint including a first arm and a second arm provided with an intermediate space therebetween, said first arm having a wider aperture, said intermediate space snugly and coaxially receiving said first angular joint, said second arm being provided with an aligned narrower aperture, said second arm having an external face provided with a plurality of mirror stabilization grooves for a right side use and for a left side use, said mirror stabilization grooves being x-shaped and extending from said aperture of said second arm so that each of said grooves is formed by two segments extending from diametrically opposite points from said aperture of said second arm; a spring located in said vertical passage of said angular joint and abutting against the step provided between said sections, a stepped swivel pin having a smaller diameter portion extending through said spring and said smaller diameter aperture of said second arm of said first U joint so that a free end of said swivel pin extends outwardly beyond said second arm, said swivel pin having a larger diameter portion which is pressed against said spring and located in said larger diameter aperture of said first arm of said first U-joint, and a resilient pin extending through a radial perforation provided in an end of said swivel pin and also in one of said mirror stabilization grooves for a right side use or in respect to one of said mirror stabilization grooves for a left side use, depending on whether the mirror is installed for use on the left side or the right side of the vehicle.

When the reversible sideview mirror is designed in accordance with the present invention, it has a simple construction and operation and avoids the disadvantages of the prior art.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a reversing mechanism of a reversible external sideview mirror in accordance with the present invention;

FIG. 2 is a view showing a bracket which is a part of the reversing mechanism, as seen in direction of the arrow A;

DESCRIPTION OF PREFERRED EMBODIMENTS

Figure 3:
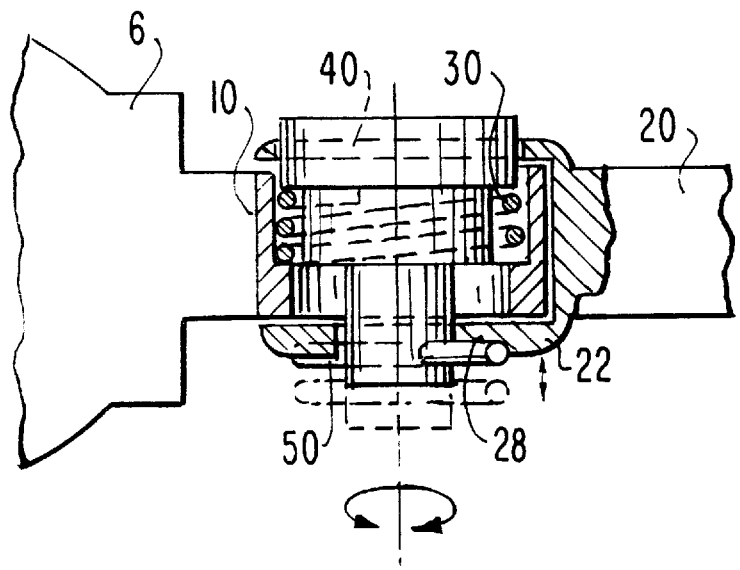
FIG. 3 is a view showing the assembled reversing mechanism with a partial cross-section.

A reversible external sideview mirror in accordance with the present invention has a mirror plate 1, a mirror frame 2, a bearing assembly 3 which receives the mirror frame, an operating transmission sub-assembly of frame/cable/rod 4 which holds a movable portion of the bearing assembly 3, a support chassis 5 of the bearing assembly 3, a support housing 6 which supports the chassis 5 and houses the middle assembly. The mirror further has a mounting base 7 for mounting the assembly onto a car body, a subassembly of sleeve/rod/nut 8 which receives the base 7 and together contributes to the mounting of the mirror assembly onto the car body, and an operating lever 9 with attached operating transmission cables 4.

In accordance with the present invention, a new left/right reversing mechanism is provided. The reversing mechanism has a first part with a ring joint 10 incorporated in the side of the chassis 5 facing the car body and having a vertical stepped passage with a first larger diameter section 11 and a second smaller diameter section 12. The reversing mechanism further has a second part which includes a U-shape joint 22 incorporated in one of the ends of a horizontal tubular support arm 20. The support arm 20 has a base 7 whose other end 21 is provided with means for mounting in the vehicle body and a section of an operating mechanism of the mirror assembly which can be formed as electrical or remote control in addition to the lever 9. The U-shaped joint 22 has a first arm 23 and a second arm 24 with an intermediate space 25 therebetween. The arm 23 has a wider aperture 26. The intermediate space 25 receives the first part of the angular joint 10. The second arm 24 has an aligned aperture 27 of a smaller diameter that the aperture 26 of the first arm.

The outside face of the second arm 24 has mirror stabilizing grooves for the use on the right side 28 and the left side 29. They are arranged in intersecting manner and radially extend from the aperture 27 so that each groove is formed by two segments extending by diametrically opposite points of the aperture 27. The angle between the segments forming one of the grooves in relation to the segments forming the other grooves is preferably from 0° to 25°, in order to correspond to different configurations and dimensions that the mirror assembly can have and/or to fit the dimensions and/or the drivers position and other dimensions relative to the vehicle on which the mirror assembly is to be installed and/or to obtain desirable characteristics of the reversing mechanism or other parts. The support arm 20 accommodates a housing 70 which guides the operating cable subassemblies.

A helical spring 30 is arranged in a vertical passage of the first section of the angular joint 10 and abuts against a step between the larger diameter section 11 and the smaller diameter section 12 of the ring joint 10.

A stepped swivel pin 40 has a smaller diameter portion 41 extending through the spring 30 and a smaller diameter aperture 27 of the second arm of the second segment of the joint 20. Its free end provided with a radial perforation 42 extends outwardly of the second arm 24. In addition, the pin has a larger diameter portion 43 which is fit pressed against the spring 30 and located in the larger diameter aperture 36 of the first arm 23 of the second segment of the U-shaped joint 22.

An elastic maintenance pin 50 of the mirror stabilization assembly installation extends through the radial hole 42 of the swivel pin 40 so as to stabilize the installed assembly. It is alternatively large in the mirror stabilization groove 28 of the right side or in the mirror stabilization groove 29 on the left side, depending on whether the mirror is installed on the left side or the right side of the vehicle.

Figure 4:
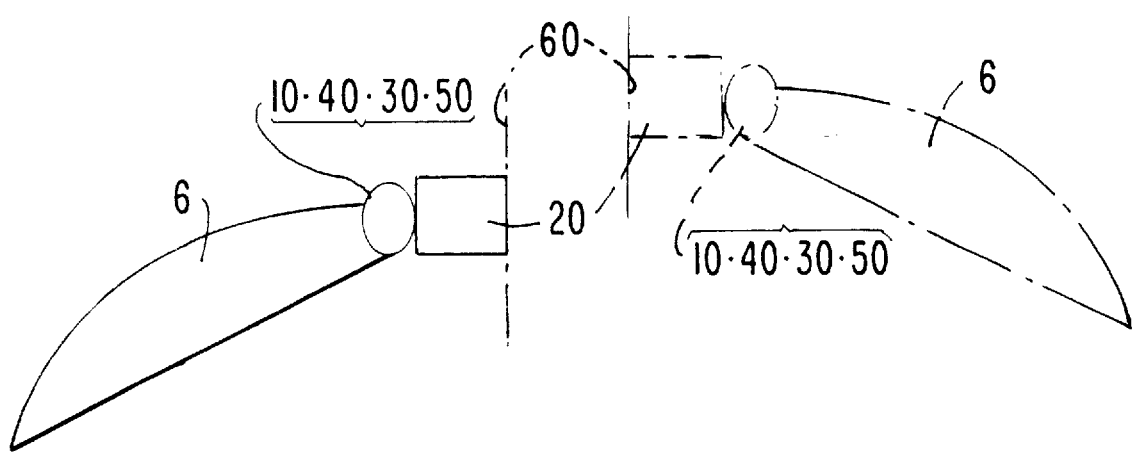
FIG. 4 is a view schematically showing left and right positions of the inventive mirror.

When the mirror is installed on the left side of the vehicle 60 shown in solid line in FIG. 4, the elastic pin 50 is lodged in the installation groove 29 on the left side, against which it stays pressed and fixed by the action of the spring 30 so as to stabilize the mirror assembly to be used in this position. In order to reverse the mirror to be used on the right side of the vehicle shown in broken line in FIG. 4, the mirror assembly is pulled backward, or pushed forward, (depending on its position it is and where one wishes to be), so that the mirror assembly changes its position. The elastic pin 50 disconnects from the left installation groove 29, the swivel pin 40 moves axially against the force of the spring 30, and the resilient pin 50 moves angularly until reaching the right side installation groove 28. At that instance, the swivel pin 40 is angularly moved in the opposite position by the spring 30, which distends connecting the elastic pin 50 in the mirror stabilization groove 28 for use on the right side. Once this is accomplished, the mirror assembly is turned 180° about its geometrical axis X and in the horizontal plane, and finally it reaches a position to be installed on the right side of the vehicle.

It will be understood that each of the elements described above, or two or more together, may also find a useful application in other types of constructions differing from the types described above.

While the invention has been illustrated and described as embodied in reversible external sideview mirror, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A reversible external sideview mirror, comprising a mirror element provided with a mirror frame; a bearing assembly for said mirror frame; a support chassis for supporting said bearing assembly; an operating transmission provided with an operating cable; and a left/right reversing mechanism for alternatively mounting the mirror on a left side and on a right side of a vehicle, said reversing mechanism comprising a first angular joint incorporated in a side of said chassis turned toward a vehicle body and having a vertical stepped passage provided with a large diameter section and a small diameter section, a second joint cooperating with said first angular joint and incorporated in a horizontal tubular support arm which has a base and an opposite end for mounting in a vehicle body, said second joint including a first arm and a second arm provided with an intermediate space therebetween, said first arm having a wide aperture, said intermediate space snugly and coaxially receiving said first angular joint, said second arm being provided with an aligned narrow aperture, said second arm having an external face provided with a plurality of mirror stabilization grooves for a right side use and for a left side use, said mirror stabilization grooves being x-shaped and extending from said aperture of said second arm so that each of said grooves is formed by two segments extending from diametrically opposite points from said aperture of said second arm; a spring located in said vertical passage of said first angular joint and abutting against the step provided between said sections, a stepped swivel pin having a small diameter portion extending through said spring and said narrow aperture of said second arm of said second joint so that a free end of said swivel pin extends outwardly beyond said second arm, said swivel pin having a large diameter portion which is pressed against said spring and located in said wide aperture of said first arm of said second joint, and an elastic pin extending through a radial perforation provided in an end of said swivel pin and also in one of said mirror stabilization grooves for a right side use or in respect to one of said mirror stabilization grooves for a left side use, depending on whether the mirror is installed for use on the left side or the right side of the vehicle.

2. A reversible external sideview mirror as defined in claim 1, wherein said second arm has an external face, said mirror stabilization grooves include a first mirror stabilization groove and a second mirror stabilization groove provided on said external face of said second arm for said right side use and said left side use of the mirror.

3. A reversible external sideview mirror as defined in claim 1, wherein said spring inserted in said vertical passage of said first angular joint is formed as a helical spring.

4. A reversible external sideview mirror as defined in claim 1, wherein said segments of one of said grooves extend at an angle to said segments of another of said grooves, which angle is between 0° and 25°.

5. A reversible external sideview mirror as defined in claim 1, wherein said operating transmission includes a frame, cable and rod subassembly.

6. A reversible external sideview mirror as defined in claim 1; and further comprising a housing which supports said chassis.

7. A reversible external sideview mirror as defined in claim 1; and further comprising a base for installation on the vehicle body, said base being formed as a part of said horizontal tubular support arm.

* * * * *